(12) United States Patent
Rudavskyi et al.

(10) Patent No.: US 12,007,586 B2
(45) Date of Patent: Jun. 11, 2024

(54) SWITCHABLE AUTOSTEREOSCOPIC DISPLAY WITH A CAPACITIVE TOUCH LOCATION SENSOR

(71) Applicant: ZHANGJIAGANG KANGDE XIN OPTRONICS MATERIAL CO. LTD, Zhangjiagang (CN)

(72) Inventors: Andrii Ivanovych Rudavskyi, Veldhoven (NL); Jan Van Der Horst, Veldhoven (NL)

(73) Assignee: ZHANGJIAGANG KANGDE XIN OPTRONICS MATERIAL CO., LTD., Zhangjiagang (CN)

( * ) Notice: Subject to any disclaimer, the term of this patent is extended or adjusted under 35 U.S.C. 154(b) by 547 days.

(21) Appl. No.: 17/417,750

(22) PCT Filed: Dec. 23, 2019

(86) PCT No.: PCT/CN2019/127615
§ 371 (c)(1),
(2) Date: Jun. 23, 2021

(87) PCT Pub. No.: WO2020/135359
PCT Pub. Date: Jul. 2, 2020

(65) Prior Publication Data
US 2022/0075204 A1    Mar. 10, 2022

(30) Foreign Application Priority Data

Dec. 24, 2018    (NL) ...................................... 2022312

(51) Int. Cl.
*G02B 30/27*    (2020.01)
*G02F 1/1333*   (2006.01)
(Continued)

(52) U.S. Cl.
CPC ......... *G02B 30/27* (2020.01); *G02F 1/13338* (2013.01); *G02F 1/134309* (2013.01);
(Continued)

(58) Field of Classification Search
None
See application file for complete search history.

(56) References Cited

U.S. PATENT DOCUMENTS 8,601,402 B1 * 12/2013 Habboub ............. G08G 5/0052
715/848
2009/0256818 A1 * 10/2009 Noguchi ............... G06F 3/0445
345/174
(Continued)

FOREIGN PATENT DOCUMENTS

| CN | 101216607 A | 7/2008 |
|----|-------------|--------|
| CN | 101258427 A | 9/2008 |

(Continued)

*Primary Examiner* — Dorothy Harris
(74) *Attorney, Agent, or Firm* — Samson G. Yu

(57) ABSTRACT

A switchable autostereoscopic display comprises: an array of pixels lined with a view altering lens stack; a switchable liquid crystal layer arranged between the array of pixels and the view altering lens stack; a main linear grid of elongate electrodes; a first sub-grid of electrodes arranged parallel to and between the array of pixels and the main linear grid of elongate electrodes, wherein the first sub-grid is spaced apart from the main linear grid; a second sub-grid of electrodes arranged parallel to and spaced apart from the first sub-grid and parallel to the main linear grid to provide a capacitive touch location sensor and wherein the elongate electrodes, each having a width g, of the main linear grid are arranged at a pitch p and wherein the ratio g/p is at least 0.75.

20 Claims, 3 Drawing Sheets

(51) Int. Cl.
  *G02F 1/1343*   (2006.01)
  *G06F 3/044*    (2006.01)
  *G09G 3/36*     (2006.01)

(52) U.S. Cl.
  CPC ........ *G02F 1/13439* (2013.01); *G06F 3/0443* (2019.05); *G09G 3/3607* (2013.01)

(56) References Cited

U.S. PATENT DOCUMENTS

| | | | |
|---|---|---|---|
| 2012/0242661 A1* | 9/2012 | Takagi | G02B 30/27 345/87 |
| 2014/0253490 A1* | 9/2014 | Sumi | G06F 3/0445 345/174 |
| 2014/0292712 A1* | 10/2014 | Koito | G02B 30/28 345/174 |
| 2015/0035873 A1* | 2/2015 | Shima | G09G 3/3413 345/690 |
| 2017/0048516 A1* | 2/2017 | Yang | H10K 59/50 |

FOREIGN PATENT DOCUMENTS

| | | |
|---|---|---|
| CN | 101341762 A | 1/2009 |
| CN | 101438599 A | 5/2009 |

\* cited by examiner

SWITCHABLE AUTOSTEREOSCOPIC DISPLAY WITH A CAPACITIVE TOUCH LOCATION SENSOR

TECHNICAL FIELD

The disclosure relates to a switchable autostereoscopic display.

BACKGROUND

Electrically switchable two-dimensional and three-dimensional (2D/3D) displays, commonly known as switchable autostereoscopic displays, have attracted great attention in the last two decades. In one approach, a liquid crystal display (LCD) having rows and columns of pixels is integrated with a lenticular device that comprises an array of semi-cylindrical micro-lenses (lenticulars) and a liquid crystal medium adjacent thereto. Each lenticular is then associated with a group of at least two columns of pixels that extend parallel with the lens, or under an angle thereto. The refractive index of the lenticulars is fixed, but the refractive index of the adjacent liquid crystal medium can be changed by switching between two liquid crystalline phases. In the 2D mode, both refractive indexes match, thereby depriving the lenticulars from a focusing effect and causing the lenticular device to behave as a transparent and flat optical panel. In the 3D mode, the liquid crystal medium is in the other liquid crystalline phase. The refractive indexes do not match anymore, which allows each lenticular to exhibit a focusing effect. This makes it possible to direct the output from different pixel columns to different spatial positions in front of the display, which on its turn allows that a stereoscopic image is perceived by a viewer. Therefore, the controlled switching between liquid crystalline phases has become crucial in the design of displays that can switch between 2D and 3D modes.

Such a switchable autostereoscopic display is known from e.g. WO2010150166. This publication describes a display with an array of pixels lined with a view altering lens stack having a plurality of lens elements. A switchable liquid crystal layer is arranged between the array of pixels and the lens stack. In one embodiment a first planar electrode is arranged on top of the lens stack and a second planar electrode is arranged between the array of pixels and the switchable autostereoscopic display. By applying a voltage on the first and second planar electrodes, an electrical field is generated, which switches the liquid crystals from a first alignment to a second alignment.

If the switchable autostereoscopic display is to be combined with a capacitive touch location sensor, this capacitive touch location sensor needs to be positioned on top of the view altering lens stack, as the planar electrodes would block the electrical field and therefore would not be able to detect a finger placed on the display. This prevents the arrangement of the electrodes of the capacitive touch location sensor in-cell, i.e. on the same substrate on which the pixels are arranged.

WO2010150166 also discloses an embodiment wherein a linear grid of elongate electrodes is arranged between the array of pixels and the switchable autostereoscopic display, wherein a voltage is applied to the electrodes, such that a planar electrical field is generated in the switchable liquid crystal layer.

The linear grid of elongate electrodes would typically act as a Faraday cage and effectively block any electrical field. This typically would prevent the arrangement of the electrodes of the capacitive touch location sensor in-cell. It is a desire, however, to position a capacitive touch location sensor in-cell rather than on top of the view altering lens stack.

SUMMARY

Technical Problem

Solution to Problem

Technical Solution

It is however an object of the disclosure to reduce or even remove the abovementioned disadvantages.

This object is achieved according to the disclosure with a switchable autostereoscopic display comprising:
- an array of pixels lined with a view altering lens stack, wherein the view altering lens stack has a plurality of lens elements for directing the output from different pixels to different spatial positions to enable a stereoscopic image to be viewed;
- a switchable liquid crystal layer arranged between the array of pixels and the view altering lens stack, which liquid crystals of the switchable liquid crystal layer can be aligned between a first alignment and a second alignment by an electrical field, wherein light from the pixels can pass the lens stack undeflected with the liquid crystals in the first alignment for a monoscopic image, while light from the pixels is deflected by the lens stack with the liquid crystals in the second alignment for a stereoscopic image;
- a main linear grid of elongate electrodes arranged parallel to and between the array of pixels and the switchable liquid crystal layer to provide an electrical field, characterized by
- a first sub-grid of electrodes arranged parallel to and between the array of pixels and the main linear grid of elongate electrodes, wherein the first sub-grid is spaced apart from the main linear grid;
- a second sub-grid of electrodes arranged parallel to and spaced apart from the first sub-grid and parallel to the main linear grid to provide a capacitive touch location sensor and wherein the elongate electrodes, each having a width g, of the main linear grid are arranged at a pitch p and wherein the ratio g/p is at least 0.75, preferably at least 0.9.

In a switchable autostereoscopic display according to the disclosure, the view altering lens stack is usually a lenticular lens stack with elongate lenses. Such lens stack is displayed in e.g. FIG. 1 (having reference numeral 8). The light emitted by a column of pixels that is behind a particular elongate lens travels the same trajectory through the elongate lens and egresses from the display in the same spatial direction in front of the display. In other words, it egresses as a plane-like beam wherein the elongate lens lies in that plane. This makes it possible to direct the output from different pixel columns to different spatial positions in front of the display, which on its turn allows the display of separate images—in this case a left-eye image and a right-eye image, allowing the viewer to perceive a stereoscopic image.

Because the first and second sub-grid are arranged in-cell and between the array of pixels and the main linear grid of elongate electrodes, one would expect that the first and second sub-grid would not be able to detect any finger touching the view altering lens stack. It has however unexpectedly been discovered that when the ratio g/p is at least 0.75, preferably at least 0.9, wherein g is the width of the elongate electrodes and p is the pitch of the elongate electrodes, the first and second sub-grid electrodes are still able to detect a disturbance of the electrical field by a finger touching the view altering lens stack.

So, with this ratio g/p it is possible to provide a capacitive touch location sensor, which is arranged in-cell, on the same substrate as the array of pixels and the main linear grid. This provides for a more convenient and more cost-effective way of manufacturing a switchable autostereoscopic display with a capacitive touch location sensor.

Usually, in a switchable autostereoscopic display according to the disclosure, the ratio g/p is at least 0.75. It is for example at least 0.77, at least 0.78, 0.80, at least 0.83, at least 0.85 or at least 0.88. Preferably, it is at least 0.90, more preferably, it is at least 0.92 and even more preferably it is at least 0.95. It is typically in the range of 0.76-0.99. It may also be in the range of 0.80-0.96 or in the range of 0.84-0.94.

Usually, in a switchable autostereoscopic display according to the disclosure, the spacing h between the first sub-grid and the main linear grid is less than 150 pm. It may also be less than 125 pm, less than 100 pm, less than 75 pm, less than 60 pm or less than 50 pm. Preferably, it is less than 40 pm, more preferably less than 30 pm and even more preferably less than 20 pm. Typically, it is in the range of 5-120 pm. In particular it is in the range of 10-100 μm, more in particular in the range of 10-35 pm. A smaller spacing increases the transparency of the main linear grid (see e.g. FIG. 4) or the sensitivity of the first and second sub-grid electrodes.

Typically, in a switchable autostereoscopic display according to the disclosure, the ratio g/p is at least 0.90 and the spacing h between the first sub-grid and the main linear grid is less than 50 pm.

In another preferred embodiment of the switchable autostereoscopic display according to the disclosure, the first and second sub-grid provide a checkered pattern of electrodes, wherein an electrode of the first sub-grid is bordered by electrodes of the second sub-grid and vice versa.

With the checkered pattern a very dense pattern of electrodes is obtained, while keeping the layer in which the electrodes are positioned thin.

In another embodiment of the switchable autostereoscopic display according to the disclosure, the electrodes of both the first and second sub-grid are elongate, wherein the elongate electrodes of the first sub-grid extend perpendicular to the elongate electrodes of the second sub grid.

Having a first sub-grid with elongate electrodes and a second sub-grid with elongate electrodes on top of the first sub-grid and isolated by a non-conductive layer, is a more conventional way of providing a capacitive touch location sensor, which can also be applied for this disclosure.

In yet another embodiment of the switchable autostereoscopic display according to the disclosure, the view altering lens stack has elongate lenses extending in a first direction parallel to the electrodes of the main linear grid.

Preferably, the longitudinal axis of each electrode of the main linear grid coincides with the longitudinal axis of an adjacent elongate lens when viewed in a direction perpendicular to the main linear grid.

With the particular electrical field generated by the elongate electrodes of the main linear grid, it is preferred that the first alignment and the second alignment are chosen such that they are in the plane of the main linear grid. This means that the switching between both alignments also occurs in that plane. The liquid crystals of the switchable liquid crystal layer are therefore preferably designed to switch parallel to the main linear grid of elongate electrodes, i.e. "in plane".

The electrical field to switch the liquid crystals is typically somewhat disturbed around the elongate electrodes of the main linear grid. This has the effect that the alignment of the liquid crystals is also somewhat disturbed. By arranging the elongate electrodes such that the longitudinal axis coincides with the longitudinal axis of the elongate lens when viewed in a direction perpendicular to the main linear grid, the disturbance in the alignment of the liquid crystals is least visible. In other words, the elongate electrodes are arranged adjacent to the apex of the elongate lenses. A disturbed liquid crystal alignment at or close to the apex has only a very small effect on the perceived image quality, since light from the display to a viewer egresses almost normal to the display at the apex and is therefore barely deflected.

In yet another embodiment of the switchable autostereoscopic display according to the disclosure, the curved surface of the elongate lenses is directed towards the switchable liquid crystal layer. As a result a flat surface will be directed towards the outside of the display. This increases the viewing angle when a monoscopic image is viewed on the display compared to when the curved surfaces of the lenses would be directed outwardly.

Preferably, the elongate electrodes of the main linear grid and the electrodes of the first and second sub grid are embodied as indium tin oxide layers arranged on a substrate, such as a glass layer. Indium tin oxide is largely transparent while the conductivity for the electrode is maintained. This contributes to a good view of the array of pixels.

Advantageous Effects of Disclosure

BRIEF DESCRIPTION OF DRAWINGS

Description of Drawings

These and other features of the disclosure will be elucidated in conjunction with the accompanying drawings.

Figure 1:
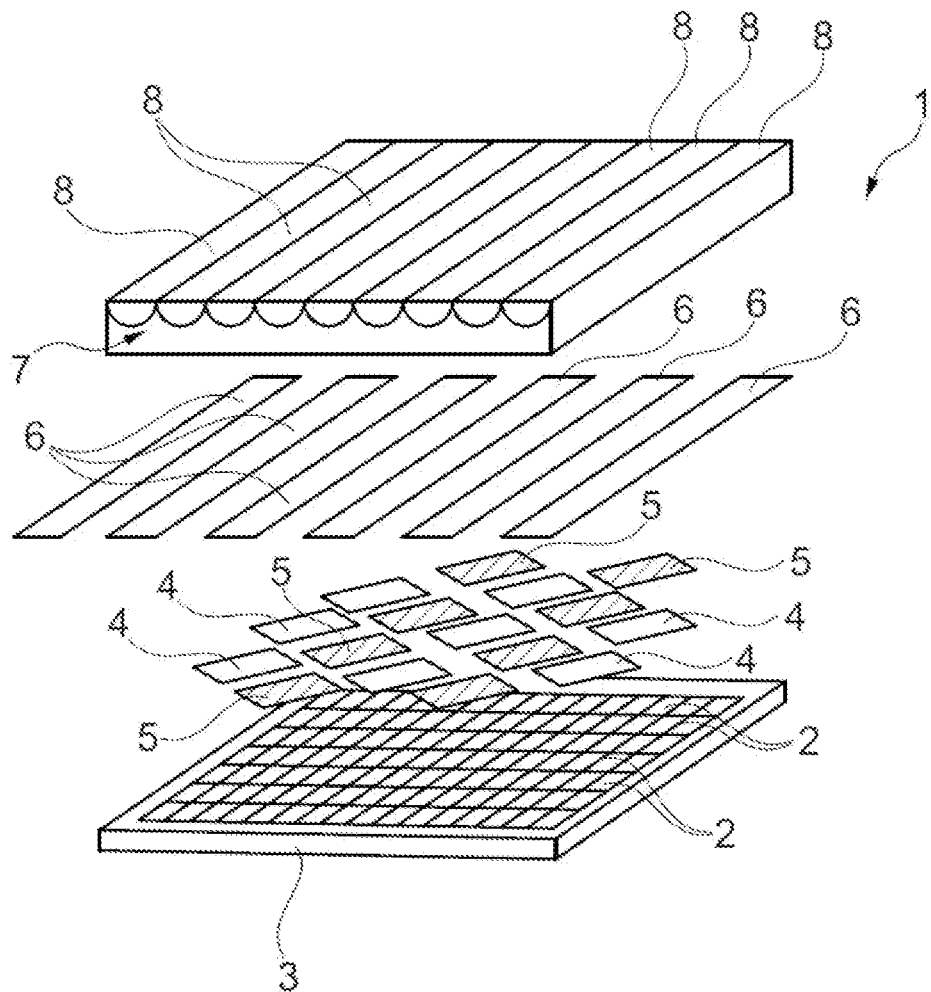

FIG. 1 shows an exploded view of an embodiment of a switchable autostereoscopic display according to the disclosure.

Figure 2:
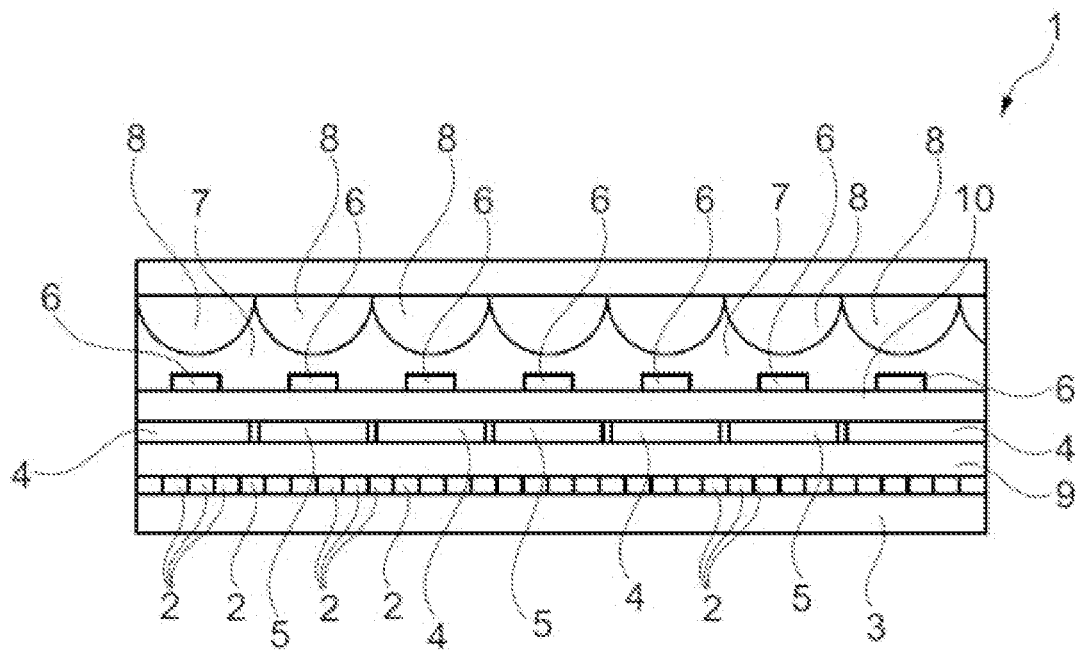

FIG. 2 shows a cross-sectional view of the embodiment of FIG. 1.

Figure 3:
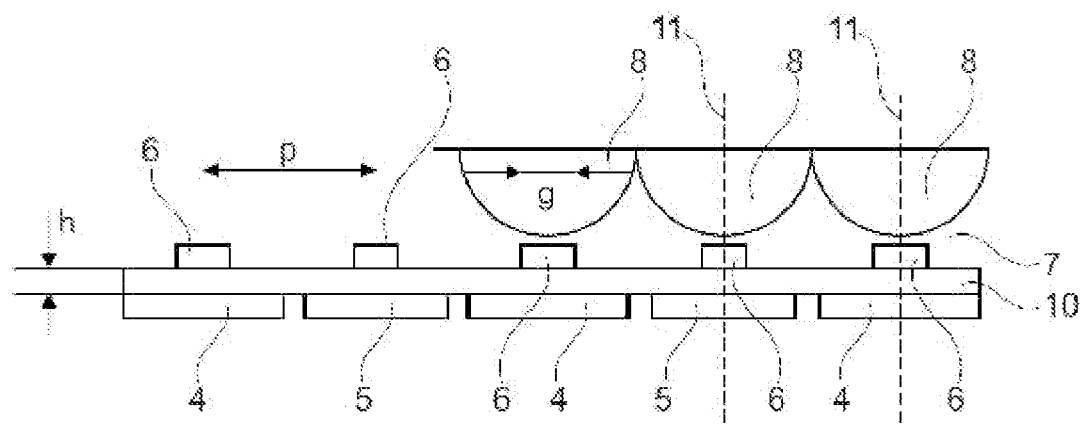

FIG. 3 shows a schematic partial view of the embodiment according to FIG. 1.

Figure 4:
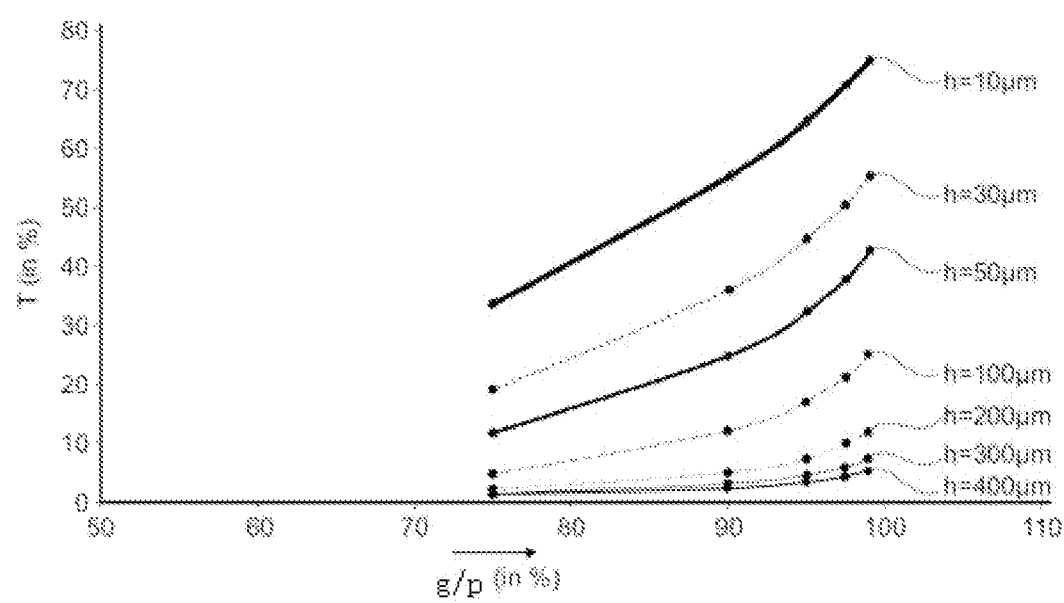

FIG. 4 shows a diagram of different calculations of the transparency of the capacitive touch location sensor in relation to the g/p ratio and the spacing h.

DETAILED DESCRIPTION

Mode for the Disclosure

Mode for Disclosure

FIG. 1 shows an embodiment of a switchable autostereoscopic display 1 according to the disclosure. The display 1 has an array of pixels 2 arranged on a substrate 3. A capacitive touch location sensor is provided over said array of pixels 2. It has a checkered pattern of electrodes 4, 5, which form a first sub-grid 4 and a second sub-grid 5 of electrodes.

On top, and isolated therefrom, is a main linear grid of elongate electrodes 6 for switching liquid crystals in a liquid crystal layer 7 arranged underneath a view altering lens stack 8.

FIG. 2 shows a cross-section of the embodiment 1 according to the disclosure. The checkered pattern of electrodes 4, 5 are arranged on a glass layer 9, which provides also a cover layer for the pixels 2.

The checkered pattern of electrodes 4, 5, which form a capacitive touch location sensor are covered by a second glass layer 10 on which the elongate electrodes 6 are arranged.

The electrodes 6 are embedded in the liquid crystal layer 7, such that the liquid crystals can be aligned between a first alignment and a second alignment by an electrical field by providing a voltage on the electrodes 6.

The liquid crystal layer 7 is in contact with the lens stack of elongate lenses 8, such that light from the pixels 2 can pass the lens stack 8 undeflected with the liquid crystals in the first alignment for a monoscopic image, while light from the pixels 2 is deflected by the lens stack 8 with the liquid crystals in the second alignment for a stereoscopic image.

FIG. 3 shows a schematic partial view of the checkered pattern of electrodes 4, 5, the glass layer 10 arranged thereon, the main linear grid with elongate electrodes 6. The width of these electrodes 6 is g, while the pitch between these electrodes 6 is p. Due to the glass layer 10, the elongate electrodes 6 are spaced over a distance of h relative to the checkered pattern of electrodes 4, 5.

A lenticular lens stack with elongate lenses 8 is arranged over a liquid crystal layer 7 arranged on the linear grid of elongate electrodes 6.

The curved surface of the elongate lenses 8 is directed towards the switchable liquid crystal layer 7.

Furthermore, the longitudinal axis 11 of each electrode 6 of the main linear grid coincides with the longitudinal axis 11 of an adjacent elongate lens 8 when viewed in a direction perpendicular to the main linear grid. This ensures that any disturbances in the electrical field around the elongate electrodes 6 is least visible.

FIG. 4 shows a diagram of different calculations of the transparency of the capacitive touch location sensor in relation to the g/p ratio and the spacing h.

The transparency is a value, which indicates how sensitive the capacitive touch location sensor is, despite the overlay of the main linear grid of electrodes. A transparency of 100% corresponds with the sensitivity of the touch sensor without any overlay, while a transparency of 0% corresponds with a fully blocked touch sensor.

As is apparent from the calculations, the transparency increases when the spacing h is reduced, while an increase in the g/p ratio also increases the transparency.

To have a usable capacitive touch location sensor for a switchable autostereoscopic display according to the disclosure, a transparency of at least 20% is desired.

What is claimed is:

1. Switchable autostereoscopic display comprising:
   an array of pixels lined with a view altering lens stack, wherein the view altering lens stack has a plurality of lens elements for directing the output from different pixels to different spatial positions to enable a stereoscopic image to be viewed;
   a switchable liquid crystal layer arranged between the array of pixels and the view altering lens stack, which liquid crystals of the switchable liquid crystal layer can be aligned between a first alignment and a second alignment by an electrical field, wherein light from the pixels can pass the lens stack undeflected with the liquid crystals in the first alignment for a monoscopic image, while light from the pixels is deflected by the lens stack with the liquid crystals in the second alignment for a stereoscopic image;
   a main linear grid of elongate electrodes arranged parallel to and between the array of pixels and the switchable liquid crystal layer to provide an electrical field;
   characterized by
   a first sub-grid of electrodes arranged parallel to and between the array of pixels and the main linear grid of elongate electrodes, wherein the first sub-grid is spaced apart from the main linear grid;
   a second sub-grid of electrodes arranged parallel to and spaced apart from the first sub-grid and parallel to the main linear grid to provide a capacitive touch location sensor and wherein the elongate electrodes, each having a width g, of the main linear grid are arranged at a pitch p and wherein the ratio g/p is at least 0.75.

2. Switchable autostereoscopic display according to claim 1, wherein the spacing h between the first sub grid and the main linear grid is less than 50 pm, preferably less than 30 pm.

3. Switchable autostereoscopic display according to claim 2, wherein the ratio g Op is at least 0.90, preferably at least 0.94.

4. Switchable autostereoscopic display according to claim 2, wherein the first and second sub grid provide a checkered pattern of electrodes, wherein an electrode of the first sub-grid is bordered by electrodes of the second sub-grid and vice versa.

5. Switchable autostereoscopic display according to claim 2, wherein the electrodes of both the first and second sub-grid are elongate and wherein the elongate electrodes of the first sub-grid extend perpendicular to the elongate electrodes of the second sub-grid.

6. Switchable autostereoscopic display according to claim 2, wherein the view altering lens stack has elongate lenses extending in a first direction parallel to the electrodes of the main linear grid.

7. Switchable autostereoscopic display according to claim 2, wherein the elongate electrodes of the main linear grid and the electrodes of the first and second sub-grid are embodied as indium tin oxide layers arranged on a substrate, such as a glass layer.

8. Switchable autostereoscopic display according to claim 2, wherein the liquid crystals of the switchable liquid crystal layer are designed to switch parallel to the main linear grid of elongate electrodes.

9. Switchable autostereoscopic display according to claim 1, wherein the ratio g/p is at least 0.90, preferably at least 0.94.

10. Switchable autostereoscopic display according to claim 9, wherein the first and second sub grid provide a checkered pattern of electrodes, wherein an electrode of the first sub-grid is bordered by electrodes of the second sub-grid and vice versa.

11. Switchable autostereoscopic display according to claim 9, wherein the electrodes of both the first and second sub-grid are elongate and wherein the elongate electrodes of the first sub-grid extend perpendicular to the elongate electrodes of the second sub-grid.

12. Switchable autostereoscopic display according to claim 9, wherein the view altering lens stack has elongate lenses extending in a first direction parallel to the electrodes of the main linear grid.

13. Switchable autostereoscopic display according to claim 1, wherein the first and second sub grid provide a checkered pattern of electrodes, wherein an electrode of the first sub-grid is bordered by electrodes of the second sub-grid and vice versa.

14. Switchable autostereoscopic display according to claim 1, wherein the electrodes of both the first and second sub-grid are elongate and wherein the elongate electrodes of the first sub-grid extend perpendicular to the elongate electrodes of the second sub-grid.

15. Switchable autostereoscopic display according to claim 1, wherein the view altering lens stack has elongate lenses extending in a first direction parallel to the electrodes of the main linear grid.

16. Switchable autostereoscopic display according to claim 15, wherein the longitudinal axis of each electrode of the main linear grid coincides with the longitudinal axis of an adjacent elongate lens when viewed in a direction perpendicular to the main linear gri.

17. Switchable autostereoscopic display according to claim 16, wherein the curved surface of the elongate lenses is directed towards the switchable liquid crystal layer.

18. Switchable autostereoscopic display according to claim 15, wherein the curved surface of the elongate lenses is directed towards the switchable liquid crystal layer.

19. Switchable autostereoscopic display according to claim 1, wherein the elongate electrodes of the main linear grid and the electrodes of the first and second sub-grid are embodied as indium tin oxide layers arranged on a substrate, such as a glass layer.

20. Switchable autostereoscopic display according to claim 1, wherein the liquid crystals of the switchable liquid crystal layer are designed to switch parallel to the main linear grid of elongate electrodes.

\* \* \* \* \*